(12) United States Patent
Addis

(10) Patent No.: US 8,181,965 B2
(45) Date of Patent: May 22, 2012

(54) REPLACEABLE BRUSH SEAL ELEMENTS

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 942 days.

(21) Appl. No.: 10/187,204

(22) Filed: Jun. 27, 2002

(65) Prior Publication Data

US 2004/0000761 A1   Jan. 1, 2004

(51) Int. Cl.
*F16J 15/447* (2006.01)
*F16J 15/44* (2006.01)

(52) U.S. Cl. ......... 277/355; 277/373; 277/413; 277/421

(58) Field of Classification Search ................... 277/355, 277/372, 373, 413, 421
See application file for complete search history.

(56) References Cited

U.S. PATENT DOCUMENTS

| | | | |
|---|---|---|---|
| 5,066,024 A | | 11/1991 | Reisinger et al. |
| 5,066,025 A | * | 11/1991 | Hanrahan ............... 277/355 |
| 5,090,710 A | * | 2/1992 | Flower ............... 277/355 |
| 5,474,305 A | | 12/1995 | Flower |
| 5,501,573 A | * | 3/1996 | Sanders ............... 415/173.5 |
| 5,597,167 A | * | 1/1997 | Snyder et al. ............... 277/355 |
| 5,630,590 A | | 5/1997 | Bouchard et al. |
| 5,704,760 A | | 1/1998 | Bouchard et al. |
| 5,997,004 A | * | 12/1999 | Braun et al. ............... 277/352 |
| 6,105,967 A | * | 8/2000 | Turnquist et al. ............... 277/355 |
| 6,168,162 B1 | | 1/2001 | Reluzco et al. |
| 6,308,958 B1 | * | 10/2001 | Turnquist et al. ............... 277/355 |
| 6,318,728 B1 | | 11/2001 | Addis et al. |
| 6,471,213 B1 | * | 10/2002 | Yuri et al. ............... 277/355 |
| 6,644,667 B2 | * | 11/2003 | Grondahl ............... 277/355 |
| 6,991,235 B2 | * | 1/2006 | Ebert et al. ............... 277/355 |
| 7,445,212 B2 | * | 11/2008 | Gail et al. ............... 277/355 |
| 2002/0020968 A1 | * | 2/2002 | Gail et al. ............... 277/355 |
| 2002/0130469 A1 | * | 9/2002 | Kono ............... 277/355 |
| 2003/0178778 A1 | * | 9/2003 | Szymbor et al. ............... 277/355 |
| 2005/0073106 A1 | * | 4/2005 | Thermos et al. ............... 277/413 |

FOREIGN PATENT DOCUMENTS

EP   1 130 294 A2   9/2001

* cited by examiner

*Primary Examiner* — Alison Pickard

(74) *Attorney, Agent, or Firm* — Bachman & LaPointe, P.C.

(57) ABSTRACT

The present invention relates to replaceable brush seal assemblies for use with turbines such as industrial gas turbines. In accordance with the present invention, a brush seal assembly comprises a flange, a brush seal mounted to the flange, and retainers preventing rotation of the brush seal relative to the flange. A method of repairing a brush seal having a back plate, side plate, and bristles is also disclosed. The method comprises the steps of removing the side plate and the bristles from the back plate, and securing a second brush seal to the back plate.

10 Claims, 6 Drawing Sheets

REPLACEABLE BRUSH SEAL ELEMENTS

BACKGROUND OF THE INVENTION

The present invention relates to replaceable brush seal elements for turbines, particularly industrial gas turbines.

A wide variety of brush seals are known in the art. Such brush seals are exemplified by U.S. Pat. Nos. 5,066,024 to Reisinger et al.; 6,168,162 to Reluzco et al.; 5,704,760 to Bouchard et al.; 5,630,590 to Bouchard et al.; and 6,318,728 to Addis et al.

Current industrial gas turbines utilize brush seal configurations with substantial cross sections. Such brush seal configurations are shown in FIGS. 1 and 2. These configurations include an integral back plate and flange structure 10, a side plate 12, and a brush pack 14 positioned between the structure 10 and the side plate 12. The brush pack typically comprises a series of bristles and typically runs 0.035 to 0.100 inches (0.0889 to 0.254 cm.) in axial width. The use of this type of configuration adds to the complexity and cost of the brush seals purchased by operators of these turbines. When the brush seal needs to be replaced, the whole element must be discarded and replaced with a new element. Thus, operators are looking for a brush seal design which is less expensive to replace than current offerings.

SUMMARY OF THE INVENTION

Accordingly, it is an object of the present invention to provide a brush seal assembly which is inexpensive and easily can be used to replace existing brush seals.

It is a further object of the present invention to provide a method of repairing a brush seal which is easy and inexpensive to perform.

In accordance with a first aspect of the present invention, a brush seal assembly broadly comprises a flange, a brush seal mounted to the flange, and means for preventing rotation of the brush seal relative to the flange.

In accordance with a second aspect of the present invention, a method of repairing a first brush seal having a back plate, side plate, and bristles is provided. The method broadly comprises the steps of removing the side plate and the bristles from the back plate, removing a portion of said back plate, and securing a replacement brush seal to a remaining portion of the back plate.

Other details of the replaceable brush seal elements of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
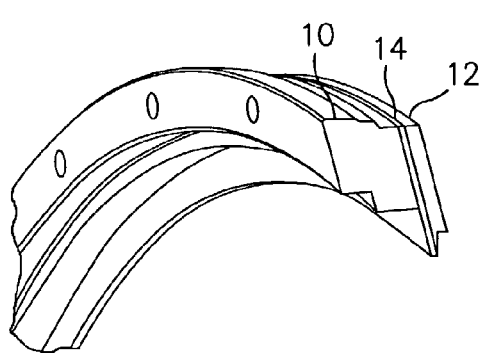
FIG. 1 is a perspective view of a first embodiment of a prior art brush seal configuration used in industrial gas turbines.
Figure 2:
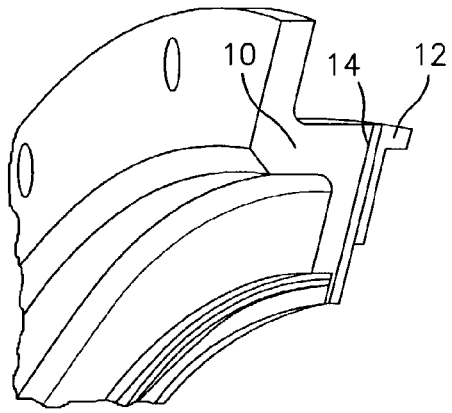
FIG. 2 is a perspective view of a second embodiment of a prior art brush seal configuration used in industrial gas turbines.
Figure 3:
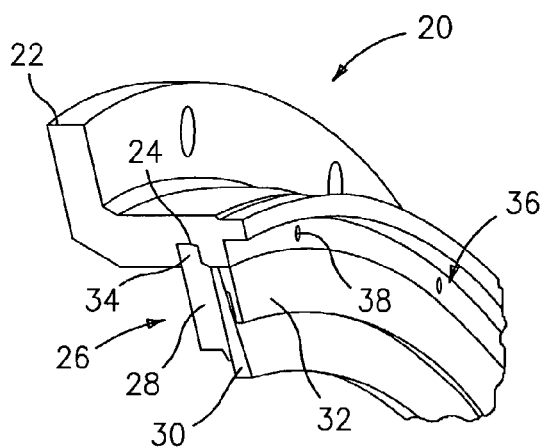
FIG. 3 is a perspective view of a first embodiment of a brush seal assembly in accordance with the present invention.

Referring now to the drawings, FIG. 3 illustrates a first embodiment of a brush seal assembly 20 in accordance with the present invention. In this assembly, an L-shaped flange 22 having an annular groove 24 machined therein is utilized. The flange 22 may be a new element or may be a refurbished flange element which previously had a portion of an integral back plate removed. The assembly further comprises a replacement brush seal element 26 having means for preventing rotation of the brush seal element 26 relative to the flange 22. The replacement brush seal element 26 comprises an integral back plate 28, brushpack 30, and side plate 32. The back plate 28, the brushpack 30 and the side plate 32 may be joined together either by welding or any other suitable technique. The rotation prevention means comprises a tongue 34 which is integrally formed with the back plate 28 and which fits or slides into the groove 24. The tongue 34 is provided with a series of openings which align with openings 36 formed in the flange element 22. The rotation prevention means further comprises a plurality of axially oriented pins 38 which pass through the openings 36 and the openings in the tongue 34. Although any suitable pin structure known in the art may be used, preferably the pins 38 comprises locking spring pins.

The flange 22, the back plate 28 and the side plate 32 may be formed from any suitable material known in the art. For example, each of these elements may be formed from 400 series stainless steel. The brushpack 30 may comprise a plurality of any suitable wire bristles having any suitable length and content.

The advantage to the brush seal element 26 of FIG. 3 is that it may be easily installed and easily removed when it needs to be replaced. Further, the brush seal element 26 is relatively inexpensive to produce. The anti-rotation feature of the brush seal assembly of the present invention is highly desirable from the standpoint of insuring a good seal between the brushpack and the components which it contacts.

Figure 4:
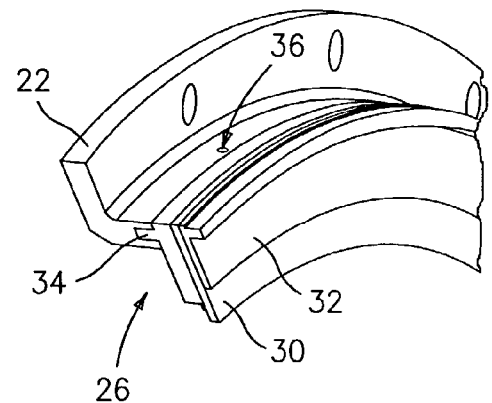
FIG. 4 is a perspective view of a second embodiment of a brush seal assembly in accordance with the present invention.

Referring now to FIG. 4, a second embodiment of a brush seal element 26 is illustrated. In this embodiment, an axially extending groove 24 has been machined into the flange 22. Further, the tongue 34 is axially aligned with the groove 24. As can be seen from this Figure, the pins 38 are now oriented in a radial direction.

Figure 5:
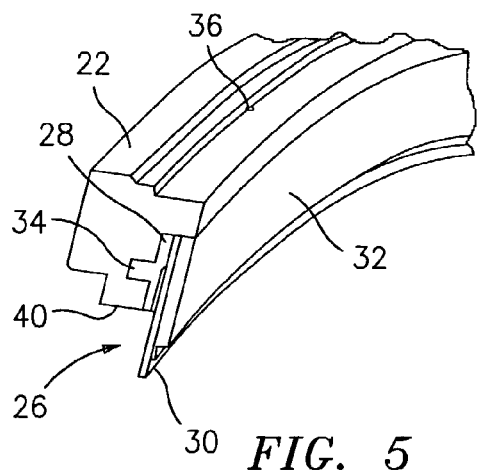
FIG. 5 is a perspective view of a third embodiment of a brush seal assembly in accordance with the present invention.

FIG. 5 illustrates yet another embodiment of a brush seal element 26 in accordance with the present invention. The brush seal element 26 is identical to that of FIG. 4 except for the back plate 28 being shorter than the back plate used in the embodiment of FIG. 4. In this embodiment, the back plate 28 does not extend below the surface 40 of the flange 22.

Figure 6:
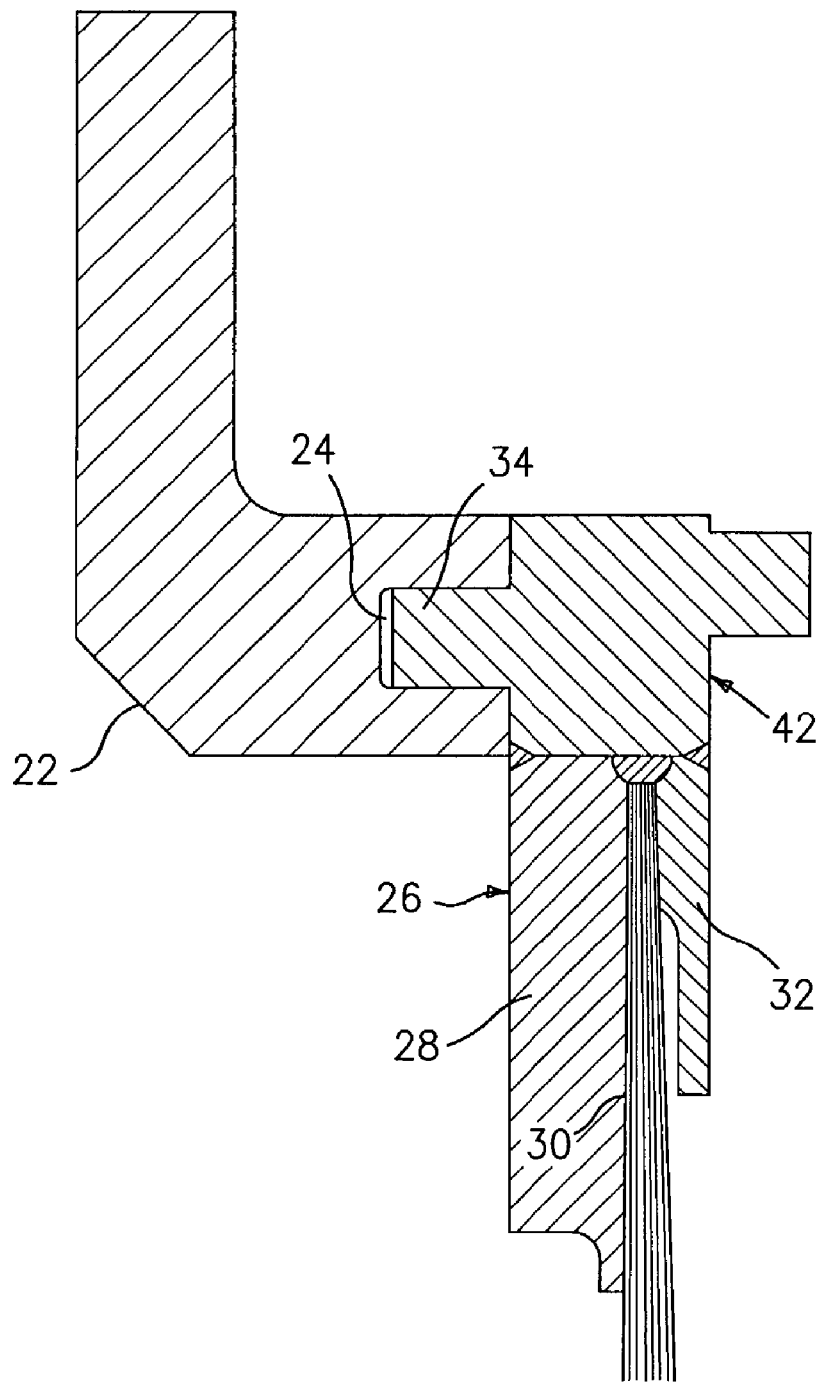
FIG. 6 is a perspective view of a fourth embodiment of a brush seal assembly in accordance with the present invention.

FIG. 6 illustrates yet another embodiment of a brush seal element in accordance with the present invention. In this embodiment, the flange 22 has an axially extending groove 24 and the brush seal element 26 includes a back plate 28, a brushpack 30 and a side plate 32. The brush seal element further includes a locating ring 42 which is joined to the other components of the brush seal element 26 such as by welding.

The locating ring 42 contains an integral tongue 34 which fits or slides within the groove 24. If desired, as before, radially oriented pins (not shown) may be used to secure the tongue 34 in position in the groove 24.

Figure 7:
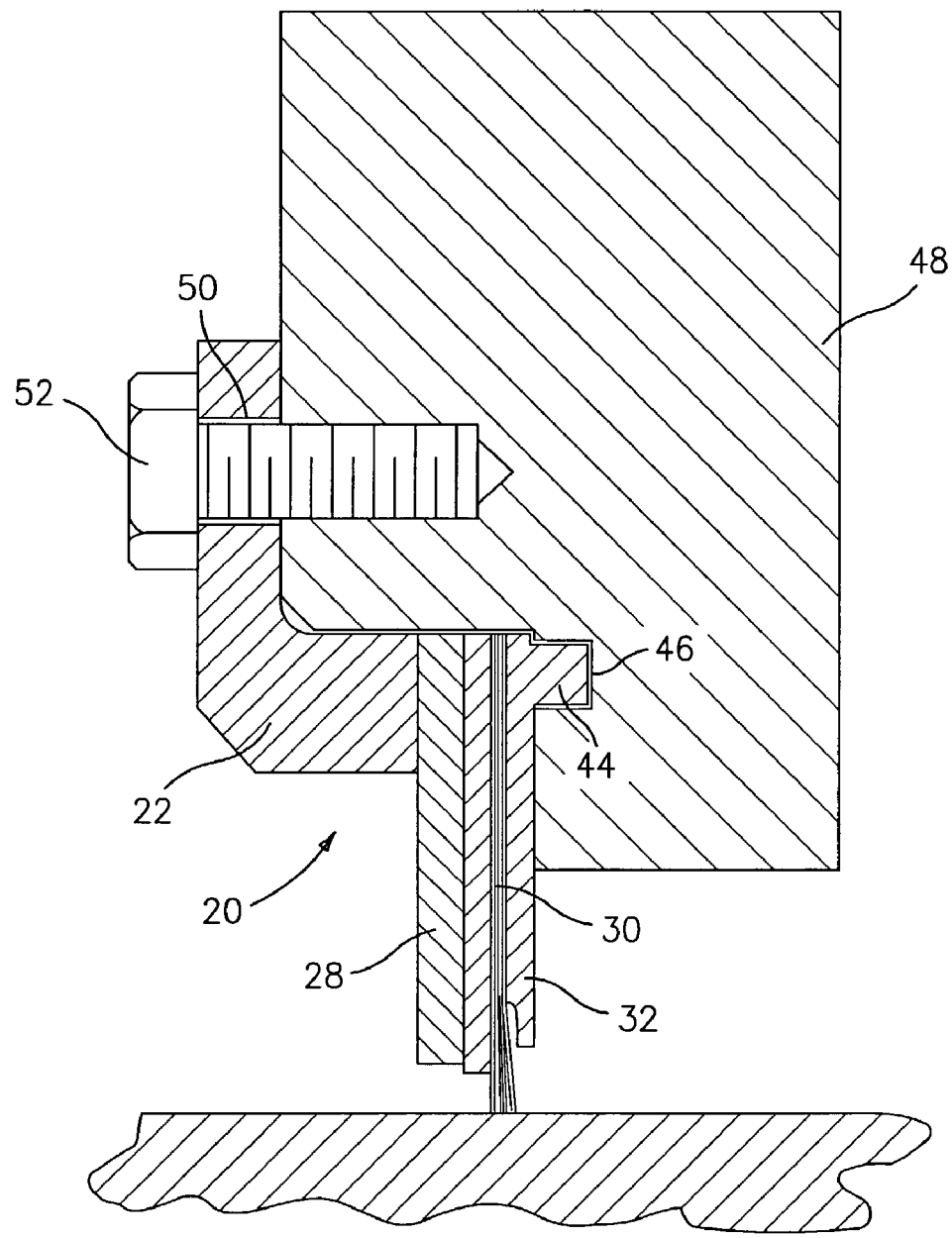
FIG. 7 is a side view of a fifth embodiment of a brush seal assembly in accordance with the present invention.
Figure 8:
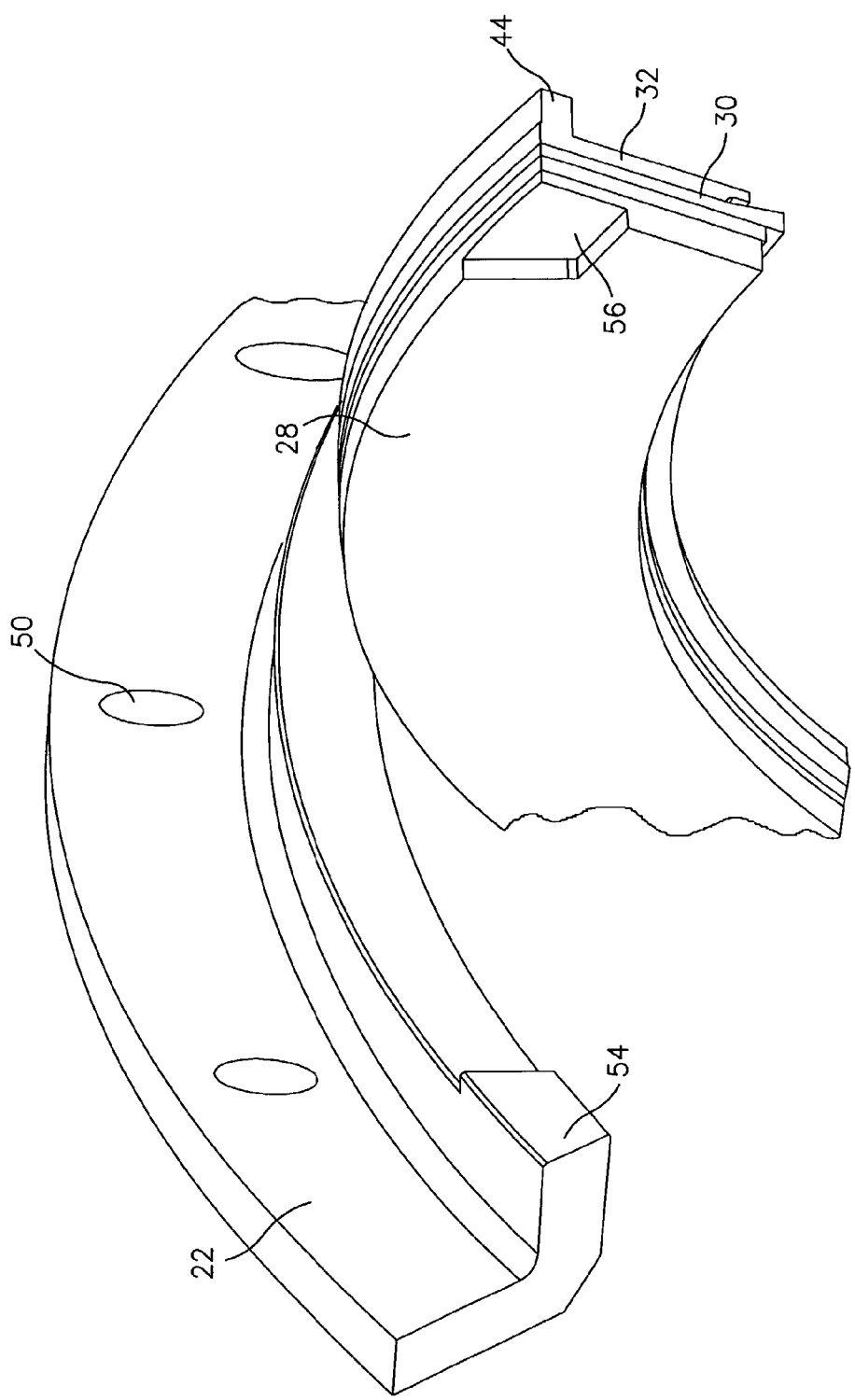
FIG. 8 is an exploded view of the brush seal assembly of FIG. 7.
Figure 9:
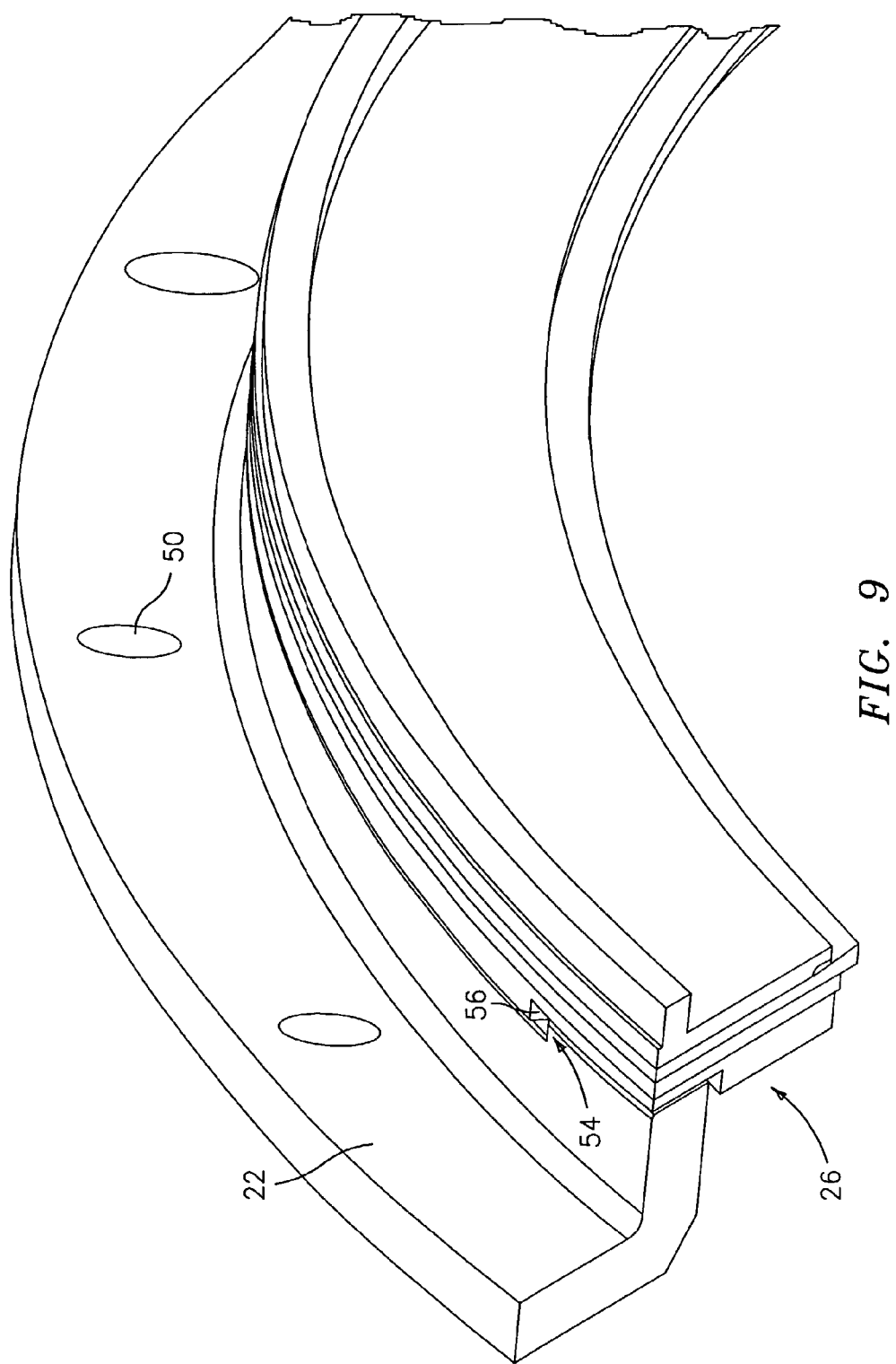
FIG. 9 is a perspective view of the brush seal assembly of FIG. 7.

Referring now to FIGS. 7-9, yet another embodiment of a brush seal assembly 20 in accordance with the present invention is illustrated. In this embodiment, the brush seal element 26 has a back plate 28, a brushpack 30, and a side plate 32 with an integral seal locating feature 44 which fits within a groove 46 in a support element 48 such as a turbine stator. The flange 22 in this embodiment has a plurality of holes 50 through which a fastener 52, such as a bolt, may be inserted to secure the flange 22 to the support element 48. As can be seen from FIG. 7, the flange 22 clamps the brush seal assembly 20 to the support element 48. FIGS. 8 and 9 illustrate the anti-rotation means for this embodiment. As shown therein, the flange 22 has an anti-rotation tab 54 machined therein. The back plate 28 has a slot 56 machined therein for receiving the tab 54.

Figure 10:
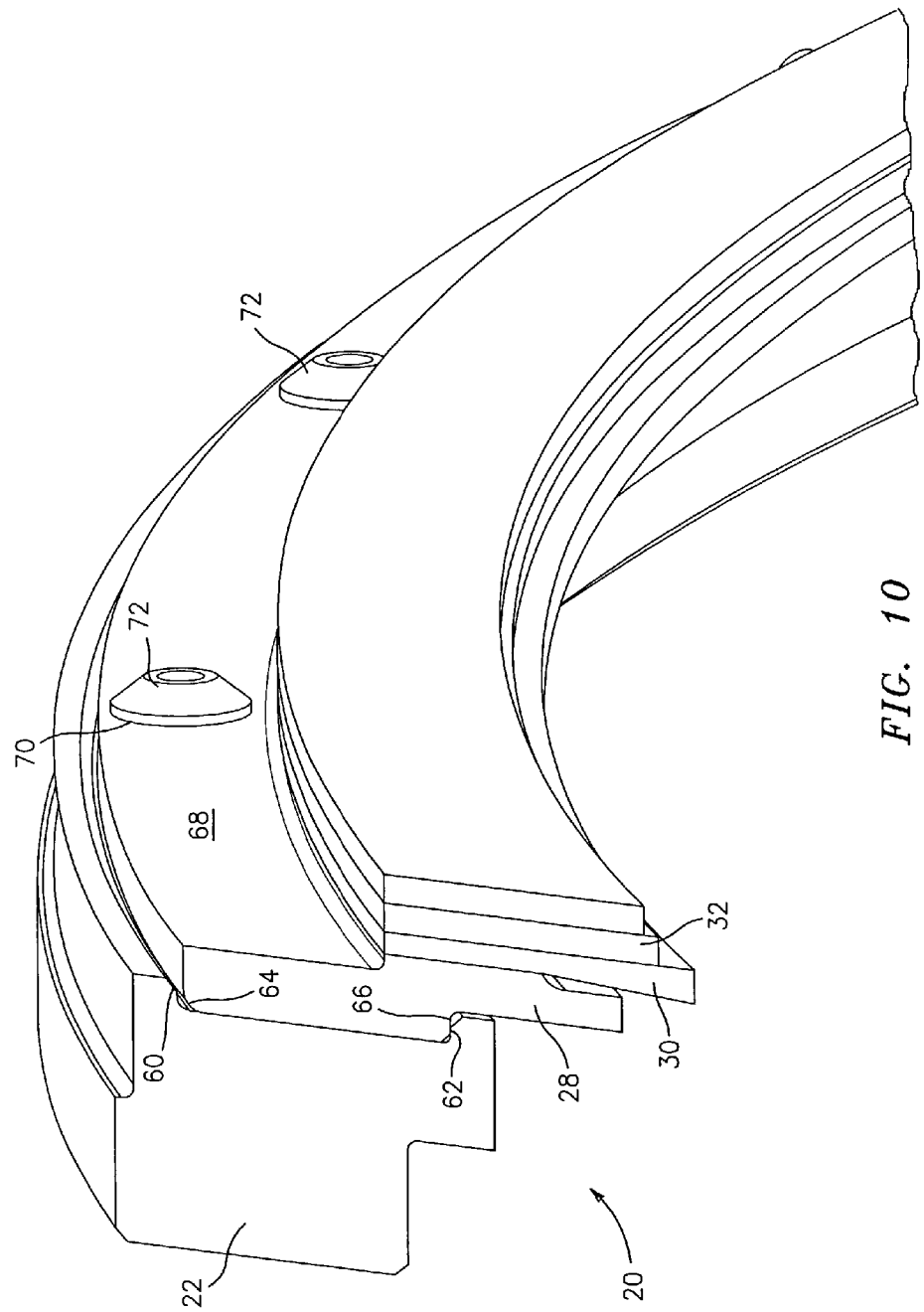
FIG. 10 is a perspective view of a sixth embodiment of a brush seal assembly in accordance with the present invention.

Referring now to FIG. 10, still another embodiment of a brush seal assembly 20 in accordance with the present invention is illustrated. In this embodiment, the flange 22 is permanently mounted to surrounding hardware such as another air seal. The flange 22 has an upper locating lip 60 and a lower locating lip 62 machined therein. The replaceable brush seal element 26 has a back plate 28 which has a an upper shoulder 64 which mates with the upper locating lip 60 and a lower shoulder 66 which mates with the lower lip 62 to properly position the seal element 26. The back plate 28 also has a raised portion 68 with a plurality of holes 70. The holes 70 align with drilled and tapped receptacles (not shown) in the flange 22 and receive fasteners 72 such as threaded fasteners. The fasteners 72 engage the receptacles and, in this way, the seal brush element 26 is secured to the flange 22.

The various seal brush elements 26 described hereinabove may comprise 360 degree elements if desired. However, in most uses, the elements 26 will only cover a portion of a circular cross section and it will take multiple elements 26 to complete 360 degrees. For example, each element 26 may cover a 90 degree segment.

As can be seen from the foregoing description, a replaceable brush seal element which is inexpensive and easy to use has been provided. To repair a first brush seal having an integral flange and back plate element 10, a side plate 12, and a brushpack 14, the method broadly comprises removing at least a portion of the back plate portion of the integral flange and back plate element 10, the side plate 12 and the brushpack 14 and securing a replacement brush seal assembly 20 to a reshaped flange 22. In one embodiment of the repair method of the present invention, the method further comprises forming a groove 24 in said reshaped flange 22 and inserting a tongue portion 34 of said replacement brush seal assembly 20 into the groove 24. After the tongue portion 34 has been inserted in groove, locking pins 38 are inserted into openings in the flange 22 and the groove 24.

In a second embodiment of the repair method of the present invention, the integral backplate/flange element 10 is machined to provide a flange 22 having a shoulder portion 52, the replacement brush seal assembly 20 is positioned so that a lip 54 on the brush seal assembly 20 rests on a shoulder. Thereafter, receptacles 58 are drilled and tapped in a portion of the flange 22 and threaded fasteners 60 are used to secure the replacement brush seal assembly 20 to the flange 22.

It is apparent that there has been provided in accordance with the present invention replaceable brush seal elements which fully satisfy the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A brush seal assembly comprising a L-shaped flange having a groove formed in a lower surface and having a plurality of walls, a single brush seal mounted to said flange, said single brush seal having a back plate, and means for preventing rotation of said brush seal relative to said flange, said rotation preventing means comprising a tongue integrally formed with said back plate, and said tongue being in direct contact with said walls of said groove and having no shims between said tongue and said walls of said groove, and said flange being a back plate of a previous brush seal.

2. A brush seal assembly according to claim 1, wherein said means for preventing rotation of said brush seal relative to said flange further comprises at least one axially oriented pin passing through holes in said flange and said tongue.

3. A brush seal assembly according to claim 2, further comprising a plurality of pins passing through said tongue and said flange.

4. A brush seal assembly according to claim 1, wherein said groove is an annular groove.

5. A brush seal assembly according to claim 1, wherein said brush seal includes a side plate, and a plurality of wires intermediate said back plate and said side plate.

6. A brush seal assembly according to claim 1, wherein said brush seal comprises a plurality of wires attached to said back plate, and said back plate has said tongue for engaging said groove and said tongue being slidable therein.

7. A brush seal assembly according to claim 6, wherein said rotation preventing means further comprises a plurality of pins passing through said tongue and said flange.

8. A brush seal assembly comprising a L-shaped flange, a brush seal mounted to said flange, and means for preventing rotation of said brush seal relative to said flange, said means for preventing rotation of said brush seal relative to said flange comprises a U-shaped groove in a lower surface of said flange and said brush seal having a tongue without shims for engaging said groove, said groove having an opening in said lower surface, two planar opposed surfaces and an end surface, each of said planar surfaces extending from said opening to said end surface, said tongue having two opposed planar surfaces in direct contact with said two opposed planar surfaces of said groove and an end surface in direct contact with said end surface of said groove, said means for preventing rotation of said brush seal relative to said flange further comprising at least one axially oriented pin passing through said flange and said tongue, and each said pin comprising a locking spring pin.

9. A brush seal assembly comprising a L-shaped flange, a brush seal mounted to said flange, and means for preventing rotation of said brush seal relative to said flange, and said means for preventing rotation of said brush seal relative to said flange comprises a U-shaped groove in a lower surface of said flange, said groove having an opening in said lower surface at a first end, a first planar surface extending from said opening to an end wall, and a second planar surface spaced apart from and parallel to said first surface, said second planar surface extending from said opening to said end wall, said brush seal having a back plate with an integrally formed tongue for directly contacting said groove, and said tongue having a first tongue surface in direct contact with said first surface of said groove and a second tongue surface in direct contact with said second surface of said groove, said means for preventing rotation of said brush seal relative to said flange further comprises at least one pin passing through said flange and said tongue, and wherein each said pin is oriented axially.

10. A brush seal assembly comprising a L-shaped flange having a groove formed in a lower surface and having a plurality of walls, a single brush seal mounted to said flange, said single brush seal having a back plate, and means for preventing rotation of said brush seal relative to said flange, said rotation preventing means comprising a tongue integrally formed with said back plate, and said tongue being in direct contact with said walls of said groove and having no shims between said tongue and said walls of said groove, and said flange being a back plate of a previous brush seal, wherein said brush seal comprises a plurality of wires attached to said back plate, and said back plate has said tongue for engaging said groove and said tongue being slidable therein, wherein said rotation preventing means further comprises a plurality of pins passing through said tongue and said flange, and wherein said tongue and groove are oriented radially and said pins are oriented axially.

* * * * *